United States Patent
Goto

(10) Patent No.: US 11,035,408 B2
(45) Date of Patent: Jun. 15, 2021

(54) HALF THRUST BEARING FOR CRANKSHAFT OF INTERNAL COMBUSTION ENGINE

(71) Applicant: DAIDO METAL COMPANY LTD., Nagoya (JP)

(72) Inventor: Shiho Goto, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/734,567

(22) Filed: Jan. 6, 2020

(65) Prior Publication Data
US 2020/0256382 A1 Aug. 13, 2020

(30) Foreign Application Priority Data
Feb. 8, 2019 (JP) .............................. JP2019-021297

(51) Int. Cl.
| | |
|---|---|
| *F16C 17/02* | (2006.01) |
| *F16C 9/02* | (2006.01) |
| *F16C 27/02* | (2006.01) |
| *F16C 33/04* | (2006.01) |
| *F16C 17/04* | (2006.01) |
| *F02F 7/00* | (2006.01) |

(52) U.S. Cl.
CPC .......... *F16C 33/046* (2013.01); *F02F 7/0053* (2013.01); *F16C 9/02* (2013.01); *F16C 17/04* (2013.01); *F16C 27/02* (2013.01); *F16C 2240/30* (2013.01); *F16C 2240/60* (2013.01)

(58) Field of Classification Search
CPC .. F16C 9/02; F16C 17/04; F16C 17/10; F16C 27/02; F16C 2240/30; F16C 2240/60; F02F 7/0053

USPC ........ 384/121, 124–125, 129, 205, 275–276, 384/282, 294, 420
See application file for complete search history.

(56) References Cited

U.S. PATENT DOCUMENTS

| | | | | |
|---|---|---|---|---|
| 3,249,391 A | * | 5/1966 | De Hart ................. | F16C 9/04 384/294 |
| 6,149,310 A | * | 11/2000 | Ono ....................... | F02F 7/0053 384/294 |
| 6,273,612 B1 | * | 8/2001 | Ono ........................ | F16C 9/04 384/276 |
| 9,605,713 B2 | * | 3/2017 | Fisher ................... | F16C 33/106 |

(Continued)

FOREIGN PATENT DOCUMENTS

| | | | |
|---|---|---|---|
| JP | H11-201145 A | 7/1999 | |
| JP | 2018112280 A | * 7/2018 | ............... F16C 9/02 |

*Primary Examiner* — Marcus Charles
(74) *Attorney, Agent, or Firm* — Snyder, Clark, Lesch & Chung, LLP

(57) ABSTRACT

A half thrust bearing for a crankshaft includes a back metal layer defining a first surface and a second surface, and a bearing alloy layer on the first surface to form a slide surface, and thrust relieves formed adjacent to both circumferential end surfaces and having a thrust relief surface consisting of the bearing alloy layer. Each circumferential end surface of the back metal layer includes an exposed end surface adjacent to the second surface, and a transition surface adjacent to the first surface. The bearing alloy layer further includes an extension portion covering the transition surface and having extension end surface adjacent to the exposed end surface, the extension end surface and the exposed end surface extending at least partly in the same plane.

5 Claims, 7 Drawing Sheets

(56) References Cited

U.S. PATENT DOCUMENTS

| | | | |
|---|---|---|---|
| 9,863,462 B2* | 1/2018 | Tanaka | F16C 33/122 |
| 2012/0263403 A1* | 10/2012 | Kimura | F16C 33/667 |
| | | | 384/130 |
| 2017/0058942 A1* | 3/2017 | Tanaka | F16C 33/205 |
| 2017/0058943 A1* | 3/2017 | Tanaka | F16C 9/02 |
| 2017/0167530 A1* | 6/2017 | Tanaka | F16C 17/04 |
| 2020/0256383 A1* | 8/2020 | Goto | F16C 33/1065 |

* cited by examiner

HALF THRUST BEARING FOR CRANKSHAFT OF INTERNAL COMBUSTION ENGINE

BACKGROUND OF THE INVENTION

(1) Field of the Invention

The present invention relates to a half thrust bearing which receives axial force of a crankshaft of an internal combustion engine.

(2) Description of Related Art

A crankshaft of an internal combustion engine is rotatably supported at a journal portion thereof by a cylinder block bottom part of the internal combustion engine via a main bearing configured by combining a pair of half bearings into a cylindrical shape.

One or both of the pair of half bearings are used in combination with a half thrust bearing which receives axial force of a crankshaft. The half thrust bearing is disposed at one or both of axial end surfaces of the half bearing.

The half thrust bearing receives the axial force generated in the crankshaft. That is, the half thrust bearing is disposed for the purpose of bearing the axial force input to the crankshaft, e.g. when the crankshaft and a transmission are connected to each other by a clutch.

A thrust relief is formed on a slide surface side of the half thrust bearing in the vicinity of each circumferential end of the half thrust bearing in such a way that a thickness of a bearing member becomes smaller toward a circumferential end surface of the half thrust bearing. Generally, the thrust relief is formed in such a way that its length from the circumferential end surface of the half thrust bearing to a slide surface and its depth in the circumferential end surface become constant independently of radial positions. The thrust relief is formed in order to absorb misalignment of the end surfaces of the pair of half thrust bearings when the half thrust bearings are put together in a split-type bearing housing (see FIG. 10 of JP H11-201145 A).

The crankshaft of the internal combustion engine is supported, at the journal portion thereof, by the cylinder block bottom part of the internal combustion engine via the main bearing composed of the pair of half bearings. In this instance, lubrication oil is fed from an oil gallery in a cylinder block wall into a lubrication oil groove formed along an inner peripheral surface of the main bearing through a through-hole in a wall of the main bearing. The lubrication oil is supplied into the lubrication oil groove of the main bearing in this way, and then supplied to the half thrust bearing. It should be noted that a laminated structure in which an aluminum bearing alloy layer or a copper bearing alloy layer are formed on one surface of a back metal layer made of an Fe alloy is generally used for the thrust bearing which receives the axial force of the crankshaft of the internal combustion engine.

BRIEF SUMMARY OF THE INVENTION

If the axial force input to the crankshaft by coupling the crankshaft with a transmission or the like is applied to the slide surface of the half thrust bearing, impact force is substantially simultaneously applied to the proximity of the circumferential end surfaces of the half thrust bearing, and therefore fatigue (cracks and/or peeling) may occur in the thrust relief or the bearing alloy layer of the slide surface adjacent to the thrust relief.

More specifically, the half thrust bearing is used by being fitted to a bearing seat (seat surface) provided in side surfaces of a cylinder block and a bearing cap. However, since an inside diameter of the bearing seat is formed slightly larger than an outside diameter of the half thrust bearing, the half thrust bearing is slightly movable in a circumferential direction. On the other hand, when a pair of the half thrust bearings are used by being combined into an annular shape (e.g., see FIG. 10 of JP H11-201145 A), a thrust collar surface of the crankshaft tends to first contact the slide surface of one of the half thrust bearings instead of simultaneously contacting both slide surfaces of the pair of half thrust bearings, and a momentary axial force from the crankshaft is input to the slide surface of the thrust bearing. Thus, one of the half thrust bearings slightly moves in the circumferential direction in accordance with rotation of the thrust collar surface, a circumferential end surface of one of the half thrust bearings on a forward side of a rotation direction of the crankshaft collides with a circumferential end surface of the other half thrust bearing on a backward side of the rotation direction of the crankshaft, and impact load is applied to the proximity of the circumferential end surfaces of the half thrust bearings. The fatigue (cracks or peeling from a steel back metal layer) tends to occur in the thrust relief adjacent to the circumferential end surface of the half thrust bearing or the bearing alloy layer of the slide surface adjacent to the thrust relief due to an effect of the impact load repeatedly applied whenever the crankshaft and the transmission are connected to each other.

Therefore, an object of the present invention is to provide a half thrust bearing for a crankshaft of an internal combustion engine in which the fatigue does not easily occur during operation.

In order to achieve the above-described object, the present invention provides a semi-annularly shaped half thrust bearing for receiving axial force of a crankshaft of an internal combustion engine, the half thrust bearing including a back metal layer made of an Fe alloy defining a first surface and a second surface on a side opposite to the first surface, and a bearing alloy layer provided on the first surface of the back metal layer, the bearing alloy layer including a slide surface on a side opposite to the back metal layer, the half thrust bearing further including two thrust relieves formed adjacent to both circumferential end surfaces of the half thrust bearing, each thrust relief including a thrust relief surface formed so that a wall thickness of the half thrust bearing becomes smaller from the slide surface toward the circumferential end surface, wherein the thrust relief surface includes a bearing alloy layer, in the thrust relief, the back metal layer is formed so that a thickness thereof becomes smaller toward the circumferential end surface, each circumferential end surface of the back metal layer includes an exposed end surface adjacent to the second surface and configuring a part of the circumferential end surface of the half thrust bearing, and a transition surface formed between the first surface and the exposed end surface, and the bearing alloy layer further includes an extension portion extending toward the second surface of the back metal layer so as to cover the transition surface, the extension portion including an extension end surface configuring a part of the circumferential end surface of the half thrust bearing, the extension end surface being formed adjacent to the exposed end surface, so that the extension end surface and the exposed end surface extend at least partly in the same plane.

An axial length (A1) of the extension portion in the circumferential end surface of the half thrust bearing may be preferably 0.2 to 1.5 mm.

An axial depth (RD1) of the thrust relief from the slide surface in the circumferential end surface of the half thrust bearing may be preferably constant between a radially inner end and a radially outer end of the half thrust bearing, and 0.1 to 1 mm.

A length (L1) of the thrust relief from the circumferential end surface of the half thrust bearing may be preferably constant between a radially inner end and a radially outer end of the half thrust bearing, and 3 to 25 mm.

Furthermore, at least the slide surface of the bearing alloy layer may be covered by an overlay layer.

As described above, the half thrust bearing for the crankshaft receives the axial force of the crankshaft of the internal combustion engine. According to the present invention, a part of the circumferential end surface of the back metal layer, i.e., the transition surface is covered with the extension portion of the bearing alloy layer, and therefore, on a thrust relief surface side of the circumferential end surface of the back metal layer, the bearing alloy layer first receives impact load and is then elastically deformed, so that the load applied to the back metal layer is eased. On the other hand, the exposed end surface of the back metal layer which is less easily elastically deformed than the extension portion of the bearing alloy layer is exposed on a rear surface side (a side opposite to the thrust relief surface) of the circumferential end surface of the back metal layer, and consequently the impact load is mainly applied to a region (the exposed end surface) of the circumferential end surface of the back metal layer that is located apart from the bearing alloy layer. Accordingly, the impact load is not easily propagated to the bearing alloy layer in the thrust relief surface or a region of the slide surface adjacent to the thrust relief, and therefore fatigue does not easily occur in the bearing alloy layer in these regions.

DETAILED DESCRIPTION OF THE INVENTION

Hereinafter, embodiments of the present invention will be described with reference to the drawings.

Embodiment 1

(Overall Configuration of Bearing Device)

Figure 1:
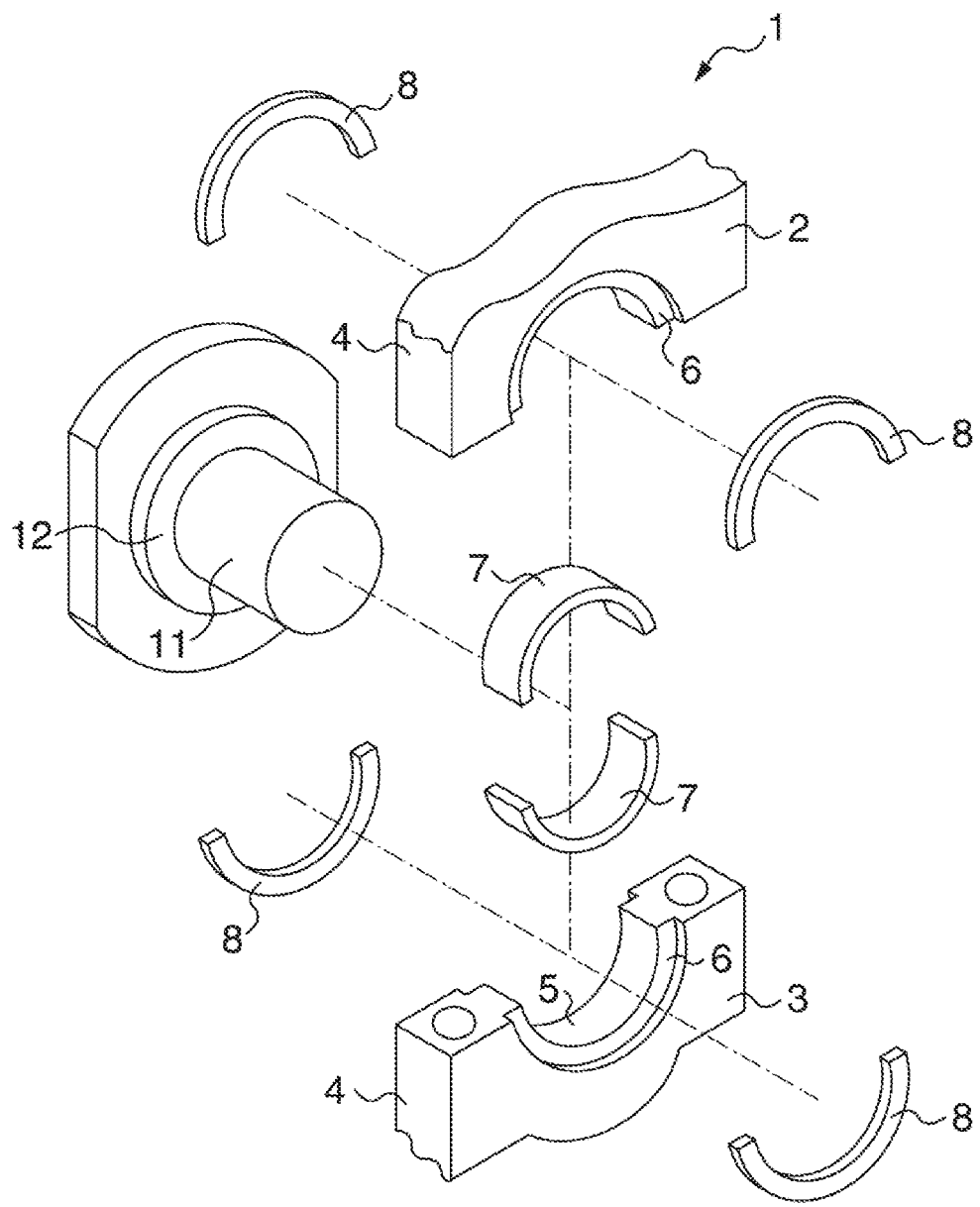
FIG. 1 is an exploded perspective view of a bearing device.
Figure 2:
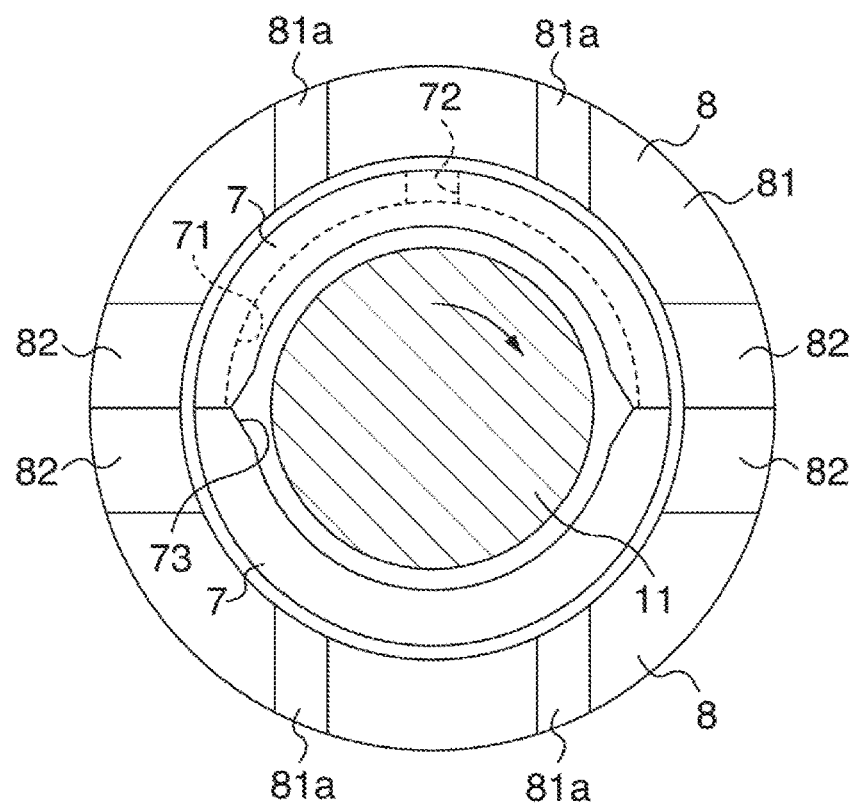
FIG. 2 is a front view of the bearing device.
Figure 3:
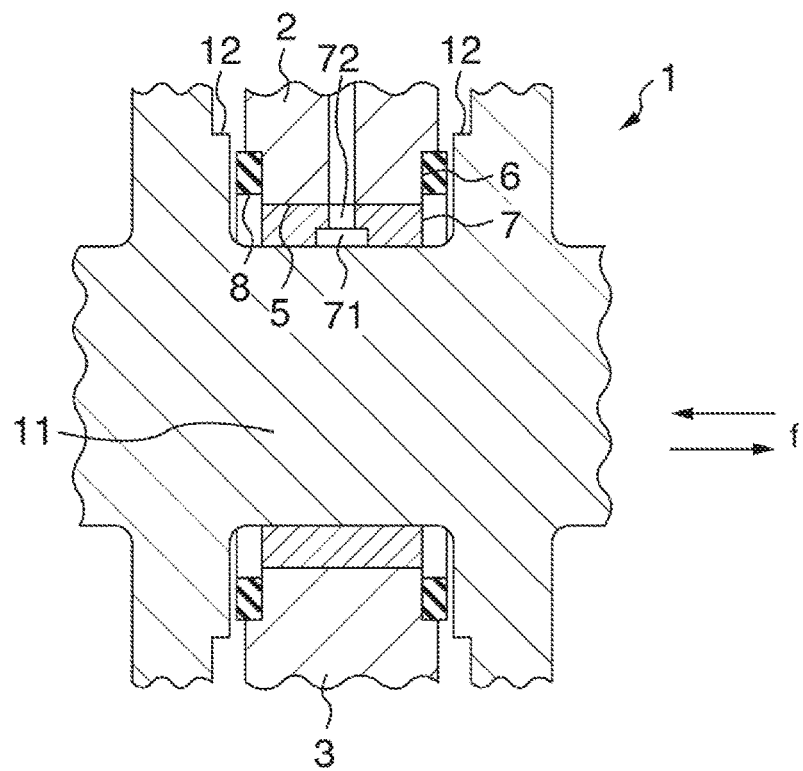
FIG. 3 is a sectional view of the bearing device.

First, an overall configuration of a bearing device 1 according to Embodiment 1 of the present embodiment is described by using FIGS. 1 to 3. As illustrated in FIGS. 1 to 3, a bearing hole (holding hole) 5 which is a circular hole penetrating between both side surfaces is formed in a bearing housing 4 configured by attaching a bearing cap 3 to a bottom part of a cylinder block 2, and bearing seats 6, 6 which are annularly shaped depressions are formed at peripheral edges of the bearing hole 5 on the side surfaces. Half bearings 7, 7 which rotatably support a journal portion 11 of a crankshaft are combined into a cylindrical shape and then fitted into the bearing hole 5. Half thrust bearings 8, 8 which receive axial force f (see FIG. 3) via a thrust collar 12 of the crankshaft are combined into an annular shape and then fitted into the bearing seats 6, 6.

Figure 7:
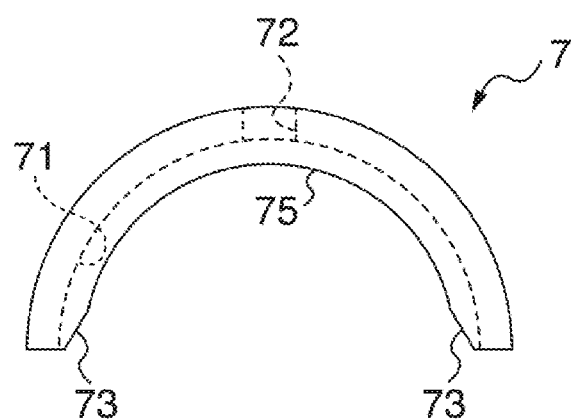
FIG. 7 is a front view of a half bearing.
Figure 8:
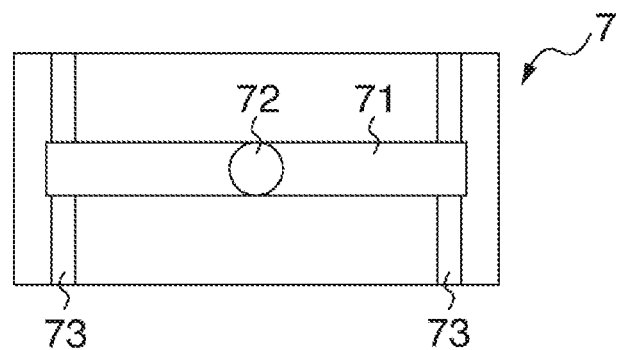
FIG. 8 is a bottom view in which the half bearing illustrated in FIG. 7 is seen from a radially inner side.

As illustrated in FIG. 2, a lubrication oil groove 71 is formed on the inner peripheral surface of the half bearing 7 on the cylinder block 2 side (upper side) of the half bearings 7 configuring a main bearing, and a through-hole 72 penetrating up to an outer peripheral surface is formed in the lubrication oil groove 71 (see FIGS. 7 and 8). It should be noted that the lubrication oil grooves may be formed also in both top and bottom half bearings.

Furthermore, crush relieves 73, 73 are formed in each of the half bearings 7 on both circumferential ends thereof, adjacent to abutment surfaces of the half bearings 7 (see FIG. 2). The crush relief 73 is a wall thickness decreasing region formed in such a way that a wall thickness of a region adjacent to the circumferential end of the half bearing 7 becomes gradually smaller toward the circumferential end. The crush relief 73 is formed with the intention of absorbing misalignment and deformation of the abutting surfaces when the pair of half bearings 7, 7 are put together.

(Configuration of Half Thrust Bearing)

Next, the configuration of the half thrust bearing 8 of Embodiment 1 is described by using FIGS. 2 to 5. The half thrust bearing 8 of the present embodiment is formed into a semi-annularly shaped flat plate by use of a bimetal in which a thin bearing alloy layer 85 is bonded to a back metal layer 84 made of an Fe alloy. It should be noted that steel, stainless steel, or the like can be used as an Fe alloy of the back metal layer 84. Moreover, a Cu bearing alloy, an Al bearing alloy, or the like can be used as the bearing alloy layer 85. The bearing alloy layer 85 is lower in hardness (namely, softer) than the back metal layer 84 made of the Fe alloy, and is therefore large in elastic deformation amount when receiving external force.

The half thrust bearing 8 includes a slide surface 81 (bearing surface) configured from the bearing alloy layer 85 in a circumferentially central region, and thrust relieves 82, 82 in regions adjacent to both circumferential end surfaces 83, 83. The thrust relief 82 has a flat thrust relief surface (plane) 82s. Two oil grooves 81a, 81a are formed on the slide surface 81 between the thrust relieves 82, 82 on both sides in order to enhance oil retention performance for the lubrication oil.

Figure 12:
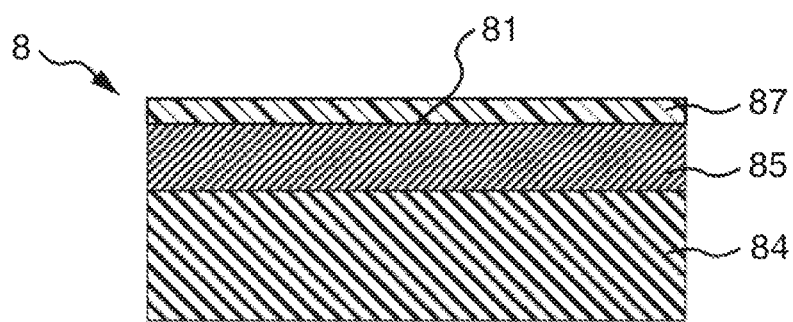
FIG. 12 is a sectional view of a half thrust bearing in which an overlay layer is formed on a bearing alloy layer.

It should be noted that, as illustrated in FIG. 12, an overlay layer 87 may be formed on the slide surface 81 of the bearing alloy layer 85. As the overlay layer 87, it is possible to use a metal or an alloy such as Sn, an Sn alloy, Bi, a Bi alloy, Pb, or a Pb alloy, or a resin slide material. The resin slide material is formed from a resin binder and a solid lubricant. Although a known resin may be used as a resin binder, it is preferable to use one or more kinds selected from the group consisting of highly heat-resistant polyamide-imide, polyimide, and polybenzimidazole. It is also possible to use, as a resin binder, a resin composition in which a highly heat-resistant resin including one or more kinds selected from the group consisting of polyamide-imide, polyimide, and polybenzimidazole is mixed with 1 to 25 volume percent of resin including one or more kinds selected from the group consisting of polyamide, epoxy, and polyethersulfone, or a polymer-alloyed resin composition. As a solid lubricant, it is possible to use molybdenum disulfide, tungsten disulfide, graphite, polytetrafluoroethylene, boron nitride, or the like. The addition ratio of the solid lubricant to the resin slide material is preferably 20 to 80 volume percent. Moreover, in order to enhance wear resistance of the resin slide material, 0.1 to 10 volume percent of hard particles of ceramics, an intermetallic compound, or the like may be contained in the resin slide material.

Furthermore, the overlay layer 87 may be applied not only to a surface serving as the slide surface 81 of the bearing alloy layer 85 that receives the axial load of the crankshaft, but also to the thrust relief surface 82s, a surface of the oil groove 81a, an outside diameter surface, an inside diameter surface, a rear surface, a circumferential end surface and the like of the half thrust bearing 8. The thickness of the overlay layer 87 is 0.5 to 20 μm, and preferably 1 to 10 μm.

It should be noted that, in the present description, the slide surface 81, the thrust relief surface 82s, the rear surface 84b, and the circumferential end surface 83 are defined as surfaces in the case where the overlay layer 87 is not given.

The thrust relief 82 is a wall thickness decreasing region formed in a region on the slide surface 81 side adjacent to both circumferential end surfaces in such a way that the wall thickness of the half thrust bearing 8 becomes gradually smaller toward the end surface thereof, and extends over the entire radial length of the circumferential end surface 83 of the half thrust bearing 8. The thrust relief 82 is formed in order to ease misalignment of the circumferential end surfaces 83, 83 of the pair of half thrust bearings 8, 8, resulting from misalignment or the like when the half thrust bearings 8 are put together in the split-type bearing housing 4.

Figure 4:
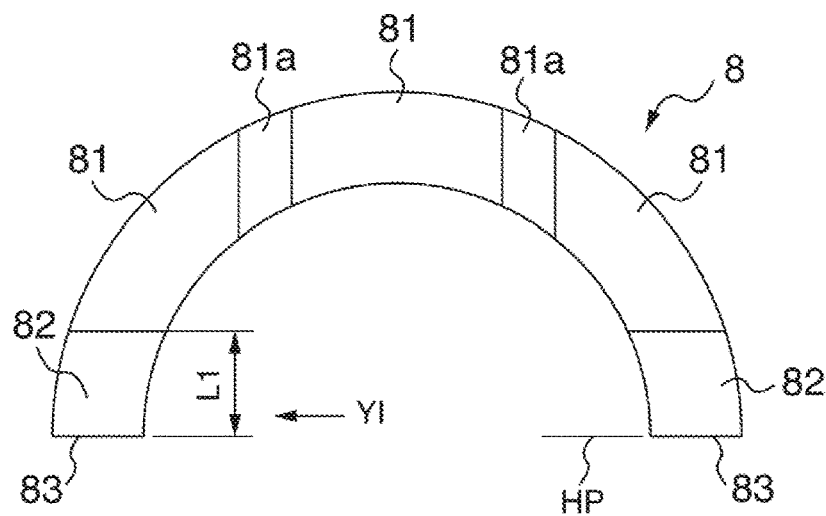
FIG. 4 is a front view of a half thrust bearing of Embodiment 1.

As illustrated in FIG. 4, the thrust relief 82 in the present embodiment has a thrust relief length L1 which is constant between a radially inner end and a radially outer end of the half thrust bearing 8.

When used in a crankshaft (of which a journal portion has a diameter of approximately 30 to 100 mm) of a small-size internal combustion engine of an automobile or the like, the thrust relief length L1 measured from the circumferential end surface 83 of the half thrust bearing 8 is set to 3 to 25 mm.

Here, the thrust relief length L1 is defined as a length measured in a perpendicular direction from a plane (thrust bearing split plane HP) including both circumferential end surfaces 83 of the half thrust bearing 8. Particularly, the thrust relief length L1 at a radially inner end of the half thrust bearing 8 is defined as a length in a perpendicular direction from the circumferential end surface 83 of the half thrust bearing 8 to a point where the thrust relief surface 82s intersects with an inner peripheral edge of the slide surface 81.

Furthermore, the thrust relief 82 of the half thrust bearing 8 is formed in such a way as to have, in the circumferential end surface 83, an axial depth RD1 which is constant between the radially inner end and the radially outer end of the half thrust bearing 8.

The axial depth RD1 of the thrust relief 82 may be set to 0.1 to 1 mm.

Here, the axial depth means an axial distance from a plane including the slide surface 81 of the half thrust bearing 8 to the thrust relief surface 82s. In other words, the axial depth is a distance perpendicular to the thrust relief surface 82s that is measured from an imaginary slide surface which is an extension of the slide surface 81 to the thrust relief 82. Therefore, the axial depth RD1 is particularly defined as a depth from the thrust relief surface 82s in the circumferential end surface 83 of the half thrust bearing 8 to the slide surface 81.

Figure 5:
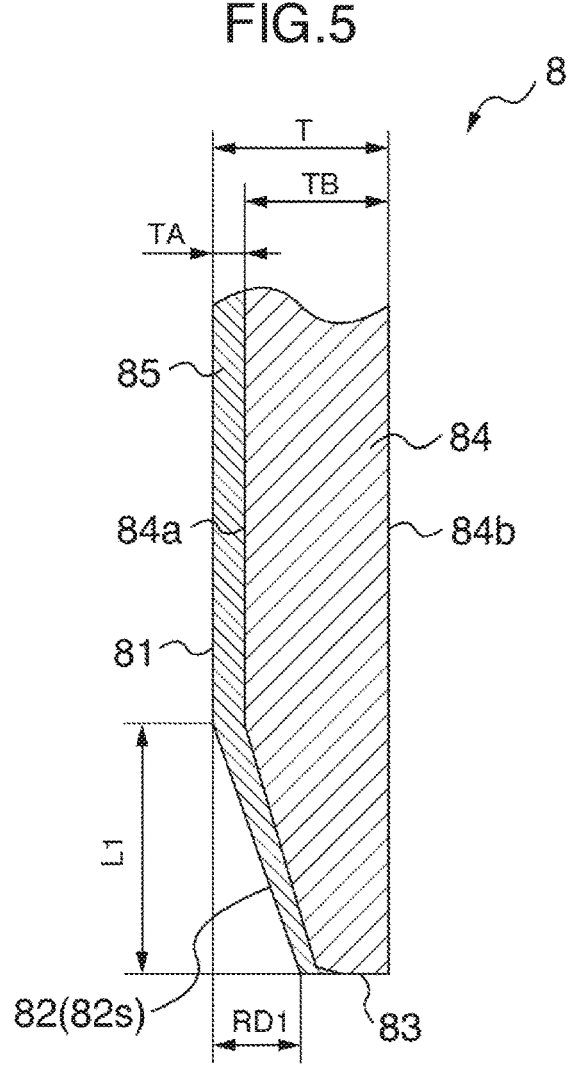
FIG. 5 is a sectional view of a circumferential end of a thrust relief of the half thrust bearing of Embodiment 1.
Figure 6:
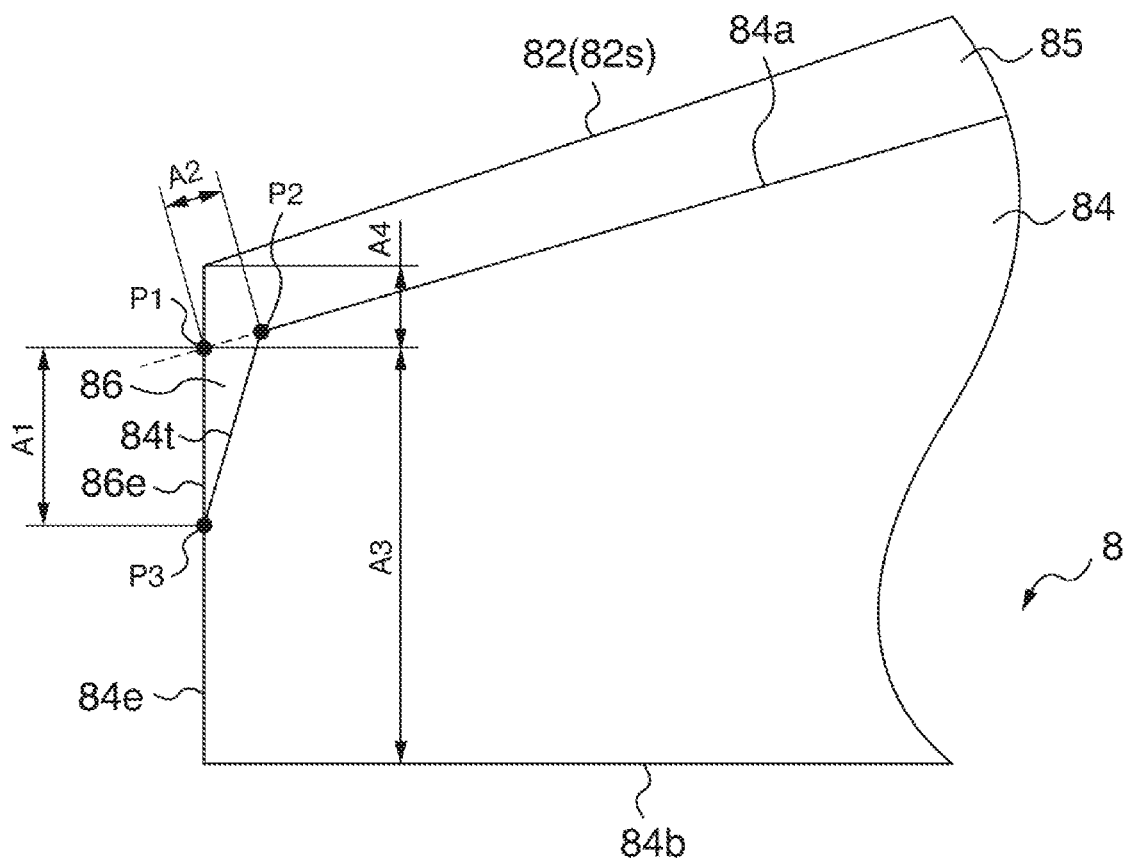
FIG. 6 is an enlarged view of the circumferential end illustrated in FIG. 5.

As illustrated in FIGS. 5 and 6, the back metal layer 84 defines two surfaces, i.e., a first surface 84a to which the bearing alloy layer 85 is bonded, and a second surface 84b configuring the rear surface of the half thrust bearing 8. Moreover, the circumferential end surface of the back metal layer 84 extending between the first surface 84a and the second surface 84b includes an exposed end surface 84e extending, adjacent to the second surface 84b, so as to configure a part of the circumferential end surface 83 of the half thrust bearing 8, and a transition surface 84t extending from the exposed end surface 84e to the first surface 84a.

The bearing alloy layer 85 has an extension portion 86 axially extending from the first surface 84a side toward the second surface 84b side so as to cover the transition surface 84t of the back metal layer 84, and this extension portion 86 has an extension end surface 86e configuring a part of the circumferential end surface 83 of the half thrust bearing 8. The extension end surface 86e is formed adjacent to the exposed end surface 84e without any step so that the extension end surface 86e and the exposed end surface 84e extend in the same plane (the circumferential end surface 83).

While the circumferential end surface 83 extends in the same plane perpendicular to the axial direction as a whole in Embodiment 1, the circumferential end surface 83 may extend so that, for example, a portion of the exposed end surface 84e adjacent to the transition surface 84t is formed to be flat (or flush) with the extension end surface 86e but the other portion of the exposed end surface 84e adjacent to the second surface 84b is set back or away from the flat surface.

Furthermore, from the viewpoint of actual manufacture, the shape of the thrust relief surface 82s may be a slightly bent curve in a circumferential section perpendicular to the slide surface 81, and the shape of the first surface 84a of the back metal layer 84 in the thrust relief 82 may also be a slightly bent curve in the circumferential section perpendicular to the slide surface 81.

More specifically, in a section perpendicular to the slide surface 81 of the half thrust bearing 8 and perpendicular to the circumferential end surface 83 of the half thrust bearing 8, the extension portion 86 of the bearing alloy layer 85 is defined as a part enclosed by an intersection point P1 of the circumferential end surface 83, and an imaginary line which is an extension of the first surface 84a of the back metal layer 84 in the thrust relief 82, an intersection point P2 of the first surface 84a and the transition surface 84t, and an intersection point P3 of the transition surface 84t and the exposed end surface 84e.

Further, an axial length A1 of the extension portion 86 which is a distance from the intersection point P1 to the intersection point P3 is preferably 0.2 to 1.5 mm, and is in particular preferably 10 to 40% of the thickness of the back metal layer 84 in the circumferential end surface.

Moreover, a thickness A2 of the extension portion 86 along the first surface 84a that is a distance from the intersection point P1 to the intersection point P2 is preferably 0.2 to 1 mm, and the thickness of the extension portion 86 becomes gradually smaller toward the intersection point P3.

It should be noted that the extension portion 86 extends over the entire radial length of the circumferential end surface 83 of the half thrust bearing 8.

The transition surface 84t is formed as a flat surface in Embodiment 1, but may be formed as a curved surface which is convex toward the extension portion 86 side, i.e., a curved surface with a curvature radius having a curvature center on a side opposite to the extension portion 86. Alternatively, the transition surface 84t may be formed from a plurality of planes or a discontinuous surface having a convex shape toward the extension portion 86 side as a whole.

Moreover, a corner between the thrust relief surface 82s and the circumferential end surface 83 may be made into a round shape (R-shape).

(Effects According to Embodiment 1)

As described above, substantially simultaneously with the input of the axial force f from the crankshaft to the slide surface 81 of the half thrust bearing 8, the circumferential end surface 83 of one half thrust bearing 8 collides with the circumferential end surface 83 of the other half thrust bearing 8, so that impact load is applied to the proximities of the circumferential end surfaces 83 of the half thrust bearings 8. It should be noted that, in contrast to the configuration in the present embodiment, if the bearing seat 6 which is an annularly shaped depression at the peripheral edge of the bearing hole 5 is formed only on the side surface of the cylinder block 2 of the bearing housing 4 which is configured by attaching the bearing cap 3 to the bottom part of the cylinder block 2 illustrated in FIG. 1, and therefore a single half thrust bearing is disposed on one side surface of the bearing housing 4, the circumferential end surface 83 of the half thrust bearing 8 collides with an end surface (split surface) of the bearing cap 3, and thereby the impact load is applied to the proximity of the circumferential end surface 83 of the half thrust bearing 8.

In the present embodiment, the extension portion 86 of the bearing alloy layer 85 is formed on the adjacent portion of the circumferential end surface 83 to the thrust relief 82, so that this portion receives the impact load and is then elastically deformed, and the load to be applied to the adjacent region of the back metal layer 84 to the bearing alloy layer 85 is thereby eased in the circumferential end surface 83. Further, the exposed end surface 84e of the back metal layer 84 which is less easily elastically deformed than the extension portion 86 is exposed on a rear surface side (a side located apart from the thrust relief 82) of the circumferential end surface 83, so that the impact load is mainly applied to a region of the back metal layer 84 located apart from the thrust relief 82. Thus, the impact load is not easily propagated to the bearing alloy layer 85 in a region of the slide surface 81 adjacent to the thrust relief surface 82s or of the thrust relief 82, so that fatigue does not easily occur in the bearing alloy layer 85 in these regions.

It should be noted that, in contrast to the present embodiment, when the extension portion is formed on the entirety (entire surface) of the circumferential end surface 83 of the half thrust bearing 8, the impact load is evenly propagated to the back metal layer of the thrust relief independently of the position in a thickness direction of the half thrust bearing 8 as in a conventional half thrust bearing, so that the impact load is propagated also to the back metal layer in the regions of the thrust relief surface and of the slide surface adjacent to the thrust relief, and therefore the fatigue tends to occur in the bearing alloy layer adjacent to the regions.

Moreover, when the axial length A1 of the extension portion 86 is excessively great as well, the ratio of the surface (exposed end surface 84e) of the back metal layer which mainly supports the impact load in the circumferential end surface 83 becomes lower, so that the heavy impact load is applied to the surface (extension end surface 86e) of the extension portion 86 as well. If the high impact load is applied to the surface of the extension portion 86 in this way, the fatigue tends to occur in the bearing alloy of the extension portion 86.

Further, if the axial length A1 and the thickness A2 of the extension portion 86 are excessively small, elastic deformation of the bearing alloy layer for easing the impact load is small, and ease of the impact load becomes insufficient. Thus, the high impact load is propagated to the back metal layer in the regions of the thrust relief surface and of the slide surface adjacent to the thrust relief, so that the fatigue tends to occur in the bearing alloy layer.

(Dimensions of Bearing Alloy Layer and Back Metal Layer)

FIG. 5 shows a sectional view of a side surface in which the vicinity of the circumferential end surface 83 of the half thrust bearing 8 is seen from the inside (in a direction of the arrow YI in FIG. 4).

When used in a crankshaft (of which a journal portion has a diameter of approximately 30 to 100 mm) of a small-size internal combustion engine of an automobile or the like, a thickness T of the half thrust bearing 8 is 1.5 to 3.5 mm, a thickness TB of the back metal layer 84 is 1.1 to 3.2 mm, and a thickness TA of the bearing alloy layer 85 is 0.1 to 0.7 mm, in a region where the slide surface 81 is formed. In the region where the slide surface 81 is formed, the thickness TB of the back metal layer 84 and the thickness TA of the bearing alloy layer 85 are preferably constant.

Moreover, as illustrated in FIG. 5, the thrust relief 82 of the half thrust bearing 8 is formed so that the wall thickness of the half thrust bearing 8 becomes gradually smaller toward the circumferential end surface 83.

As illustrated in FIG. 6, the thickness of the back metal layer 84 in the region where the thrust relief 82 is formed becomes smaller from a circumferentially central side toward the circumferential end surface, and an axial thickness A3 in the circumferential end surface 83, i.e., the axial distance A3 from the intersection point P1 of the circumferential end surface 83, and the imaginary line which is an extension of the first surface 84a to the thrust relief 82, to the second surface 84b is 0.6 to 2.7 mm.

Similarly, the axial thickness of the bearing alloy layer 85 in the region where the thrust relief 82 is formed becomes smaller from the circumferentially central side toward the circumferential end surface, and axial thickness A4 in the circumferential end surface 83, i.e., the axial distance A4 from the intersection point P1 of the circumferential end surface 83, and an imaginary line which is an extension of the first surface 84a of the back metal layer 84 toward the circumferential end surface 83, to the thrust relief surface 82s is 0.05 to 0.6 mm.

(Manufacture of Half Thrust Bearing)

The half thrust bearing 8 in the present embodiment is produced by press-molding a depression (which will finally become the thrust relief 82) on a front surface side of the bearing alloy layer of a planar multi-layered slide material including the back metal layer 84 and the bearing alloy layer 85, and then cutting the slide material into a semi-annular shape by a pair of male and female dies and a pressing machine in such a way that the depression is located at both circumferential ends. Here, a clearance between cutting portions of a pair of male and female dies is generally narrowed in order to reduce burrs resulting from the cutting. However, in the present embodiment, a clearance at cutting portions of an inner peripheral surface and an outer peripheral surface having a semi-annular shape is made narrow as heretofore, however, a clearance at the circumferential end is made wider as compared to the conventional one. Consequently, during the press-molding, the bearing alloy layer 85 on the back metal layer 84 in the proximity of the circumferential end surface is cut while plastically flowing in the clearance in such a way as to cover the side surface (circumferential end surface) of the back metal layer 84, and the extension portion 86 of the bearing alloy layer 85 is formed in the circumferential end surface 83 of the half thrust bearing 8.

It should be noted that, as described in paragraph 0017 of JP H11-201145 A, if a thrust relief is formed by a pressing machine after a multi-layered slide material is punched into a semi-annular shape (the shape of a half thrust bearing), a bearing alloy layer and a back metal layer of the multi-layered slide material in a part where the thrust relief is formed will plastically flow out mainly toward a direction in which the circumferential end surface of the punched member faces so as to run off from an original position of the circumferential end, i.e., so as to increase a circumferential length from the original circumferential end surface of the punched member. Moreover, since the bearing alloy and the back metal are different in deformation resistance, and in particular the plastic deformation amount of the bearing alloy is great, the circumferential end surface becomes non-flat. Thus, in the member in which the thrust relief is formed, it is necessary to remove, by cutting operation, the bearing alloy and the back metal which have plastically flowed and then run off from the original position of the circumferential end surface, and form a flat circumferential end surface. Therefore, in a conventional half thrust bearing, no extension including a bearing alloy layer is formed on a surface of the back metal layer in the circumferential end surface, as illustrated in FIG. 3 and the like of JP H11-201145 A.

Furthermore, although the bearing device 1 of the type in which the half bearing 7 and the half thrust bearing 8 are separated has been described in the present embodiment, the present invention is not limited thereto, and is also applicable to the bearing device 1 of the type in which the half bearing 7 and the half thrust bearing 8 are integrated.

While the embodiment of the present invention has been described in detail above with reference to the drawings, a specific configuration is not limited to this embodiment, and degrees of changes in design that do not depart from the spirit of the present invention fall within the present invention.

Embodiment 2

Figure 9:
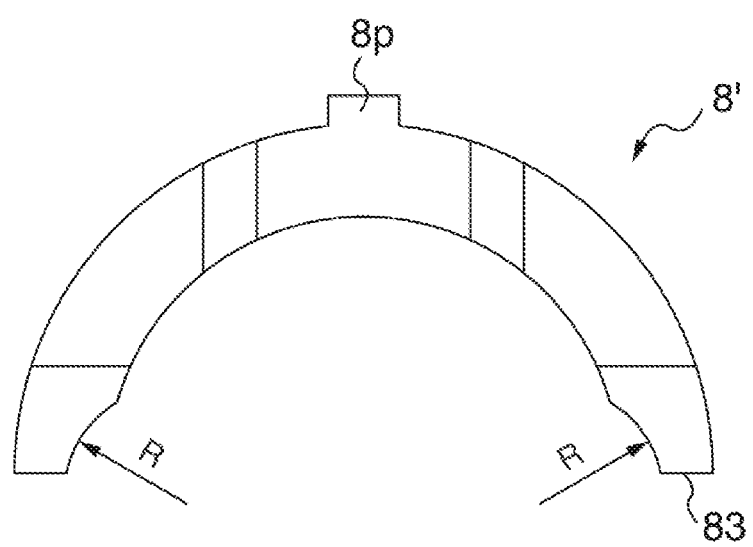
FIG. 9 is a front view of a half thrust bearing of Embodiment 2.
Figure 10:
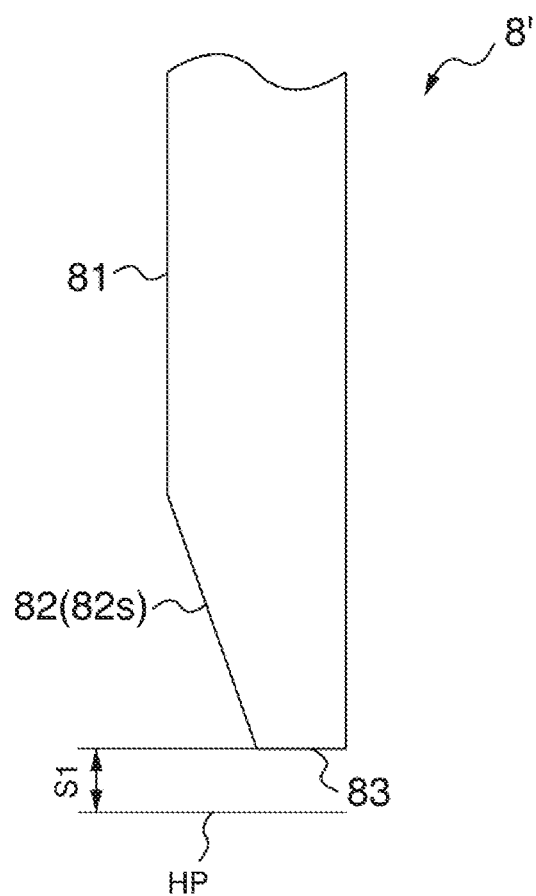
FIG. 10 is a side view of the half thrust bearing of Embodiment 2.

For example, as illustrated in FIGS. 9 and 10, the present invention can be also applied to a half thrust bearing 8' having a projection 8p projecting toward a radically outer side, for the purpose of positioning and anti-rotation. Further, a circumferential length of this half thrust bearing 8' may be shorter by a predetermined length Si than the half thrust bearing 8 illustrated in Embodiment 1. Moreover, the half thrust bearing 8' may be cut to have an arc-shape with a radius R in the inner peripheral surface in the vicinity of the circumferential end surface 83. Similarly, it is also possible to form a chamfer extending in the circumferential direction on a radially outer edge or a radially inner edge on the slide surface side of the half thrust bearing 8'.

Embodiment 3

Figure 11:
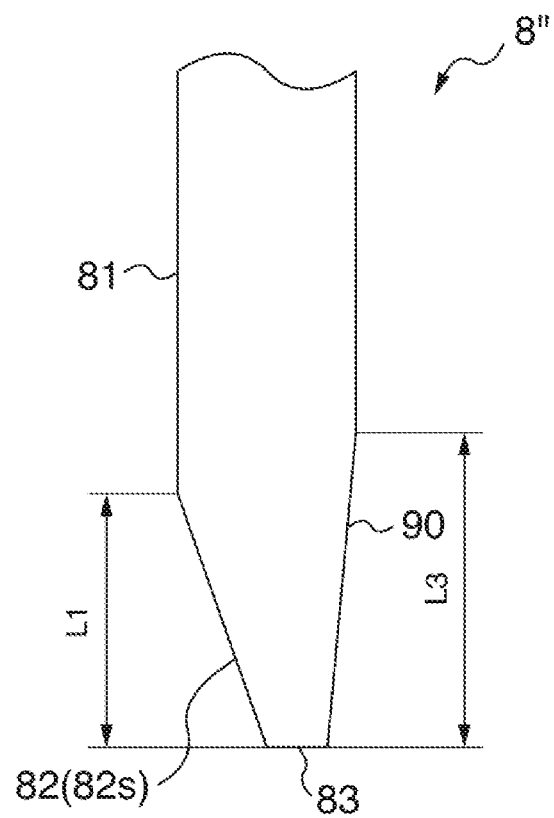
FIG. 11 is a side view of a half thrust bearing of Embodiment 3.

As illustrated in FIG. 11, a half thrust bearing 8'' according to Embodiment 3 may have a rear surface relief 90 having a shape resembling that of the thrust relief at both circumferential ends of a rear surface (a second surface of a back metal layer) on a side opposite to the slide surface 81. It should be noted that, in this case, a thickness of the back metal layer is defined as a thickness measured from the second surface in the case that the rear surface relief 90 is not formed.

Alternatively, the rear surface relief 90 may be configured in such a way as to have a plane parallel to the slide surface 81.

It should be noted that, as illustrated in FIG. 11, a relief length L3 of the rear surface relief 90 is larger than the thrust relief length L1 of the thrust relief 82 described above, but is not limited thereto, and may be the same as the thrust relief length L1, or may be smaller than the thrust relief length L1.

Furthermore, although four half thrust bearings 8 are used in the bearing device 1 in Embodiment 1, the present invention is not limited thereto, and desired advantageous effects can be obtained by using at least one half thrust bearing 8 according to the present invention. Moreover, the half thrust bearing 8 according to the present invention and a conventional thrust bearing may be paired with each other and thus used as an annularly shaped thrust bearing. Further, in the bearing device 1 according to the present invention, the half thrust bearing 8 may be integrally formed at one or both axial end surfaces of the half bearing 7 which rotatably bears a crankshaft.

The invention claimed is:

1. A semi-annularly shaped half thrust bearing for receiving axial force of a crankshaft of an internal combustion engine, the half thrust bearing comprising a back metal layer made of an Fe alloy that defines a first surface and a second surface on a side opposite to the first surface, and a bearing alloy layer provided on the first surface of the back metal layer, the bearing alloy layer comprising a slide surface on a side opposite to the back metal layer, the half thrust bearing further comprising two thrust reliefs formed adjacent to both circumferential end surfaces of the half thrust bearing, each thrust relief comprising a thrust relief surface formed so that a wall thickness of the half thrust bearing becomes smaller from the slide surface toward the circumferential end surface, wherein the thrust relief surface consists of the bearing alloy layer,
in the thrust relief, the back metal layer is formed so that a thickness thereof becomes smaller toward the circumferential end surface,
each circumferential end surface of the back metal layer comprises an exposed end surface adjacent to the second surface that configures a part of the circumferential end surface of the half thrust bearing, and a transition surface formed between the first surface and the exposed end surface, and
the bearing alloy layer further comprises an extension portion extending toward the second surface of the back metal layer so as to cover the transition surface, wherein the extension portion comprises an extension end surface configuring a part of the circumferential end surface of the half thrust bearing, the extension end surface being formed adjacent to the exposed end surface, so that the extension end surface and the exposed end surface extend at least partly in the same plane.

2. The half thrust bearing according to claim 1, wherein an axial length (A1) of the extension portion in the circumferential end surface of the half thrust bearing is 0.2 to 1.5 mm.

3. The half thrust bearing according to claim 1, wherein an axial depth (RD1) of the thrust relief from the slide surface in the circumferential end surface of the half thrust bearing is constant between a radially inner end and a radially outer end of the half thrust bearing, and 0.1 to 1 mm.

4. The half thrust bearing according to claim 1, wherein a length (L1) of the thrust relief from the circumferential end surface of the half thrust bearing is constant between a radially inner end and a radially outer end of the half thrust bearing, and 3 to 25 mm.

5. The half thrust bearing according to claim 1, wherein at least the slide surface of the bearing alloy layer is covered by an overlay layer.

* * * * *